US011438393B1

(12) United States Patent
Tribble et al.

(10) Patent No.: US 11,438,393 B1
(45) Date of Patent: Sep. 6, 2022

(54) ORIGIN SERVER ADDRESS ROTATION

(71) Applicant: Amazon Technologies, Inc., Seattle, WA (US)

(72) Inventors: Alex Jennifer Tribble, Seattle, WA (US); Bradley Smith, Seattle, WA (US); Robert James Hanson, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 16/584,751

(22) Filed: Sep. 26, 2019

(51) Int. Cl.
*H04L 65/612* (2022.01)
*H04L 61/5007* (2022.01)
*H04L 47/125* (2022.01)
*H04L 61/4511* (2022.01)

(52) U.S. Cl.
CPC ........ *H04L 65/4084* (2013.01); *H04L 47/125* (2013.01); *H04L 61/1511* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 6,785,704 B1 * | 8/2004 | McCanne | ........... | H04L 67/1008 709/239 |
| 10,958,662 B1 * | 3/2021 | Sole | ....................... | H04L 63/105 |
| 2007/0027995 A1 * | 2/2007 | Hahn | ................ | H04L 29/12283 709/230 |
| 2012/0116896 A1 * | 5/2012 | Holloway | ........... | H04L 63/1416 705/14.73 |
| 2012/0117239 A1 * | 5/2012 | Holloway | ........... | H04L 67/2861 709/226 |
| 2012/0324113 A1 * | 12/2012 | Prince | ..................... | H04L 69/40 709/226 |
| 2013/0036466 A1 * | 2/2013 | Penta | ..................... | H04L 63/102 726/22 |
| 2014/0334304 A1 * | 11/2014 | Zang | ................... | H04L 47/2441 370/235 |
| 2015/0188949 A1 * | 7/2015 | Mahaffey | .............. | H04W 12/37 726/1 |

(Continued)

OTHER PUBLICATIONS

Mockapetris, P., "Domain Names—Implementation and Specification," Request for Comments: 1035, Network Working Group, Nov. 1987, 52 pages.

*Primary Examiner* — Davoud A Zand
(74) *Attorney, Agent, or Firm* — Davis Wright Tremaine LLP

(57) ABSTRACT

An address rotation system detects a trigger to initiate rotation of location information of an origin server that provides content to be served by a content delivery service. In response to the trigger, the address rotation system identifies an active networking route of the content delivery service and obtains, from the route, an assigned first name of the origin server and a first network address in a name service. The address rotation system replaces the first network address with a second network address and updates the name service to resolve a second name to the second network address. The address rotation system updates the content delivery service with the second name to allow the content delivery service to use the second name to obtain the second network address and access the origin server.

17 Claims, 9 Drawing Sheets

(56) References Cited

U.S. PATENT DOCUMENTS

2015/0207814 A1* 7/2015 Prince ................ H04L 63/1441
 726/23
2020/0053111 A1* 2/2020 Jakobsson ............... H04L 51/12

* cited by examiner

ORIGIN SERVER ADDRESS ROTATION

BACKGROUND

Organizations, such as computing resource service providers, often rely on Content Delivery Network (CDN) services to process incoming requests from various client devices over a network, such as the Internet. CDN servers may cache data from origin servers in order to reduce the load of these origin servers in response to the requests from the client devices. For instance, if a user, through a browser application installed on a client device, inputs a Uniform Resource Locator (URL) for a particular website, the client device may submit a request to a particular CDN server to obtain data for the website. If the CDN server does not have the data available, the CDN server may access the origin servers to obtain the requested data. CDN servers, therefore, allow organizations to scale, for example, by causing content to be served from multiple locations in order to handle large amounts of load. As a result, origin servers (which are typically fewer and not as widely distributed) are generally more favorable targets for malicious entities attempting to harm an organization's operations. A dedicated denial of service (DDoS) attack is more likely to be successful when focused on an origin server than on a CDN server since CDN servers are typically components of a larger and more redundant architecture.

BRIEF DESCRIPTION OF THE DRAWINGS

Various techniques will be described with reference to the drawings, in which.

DETAILED DESCRIPTION

Figure 1:
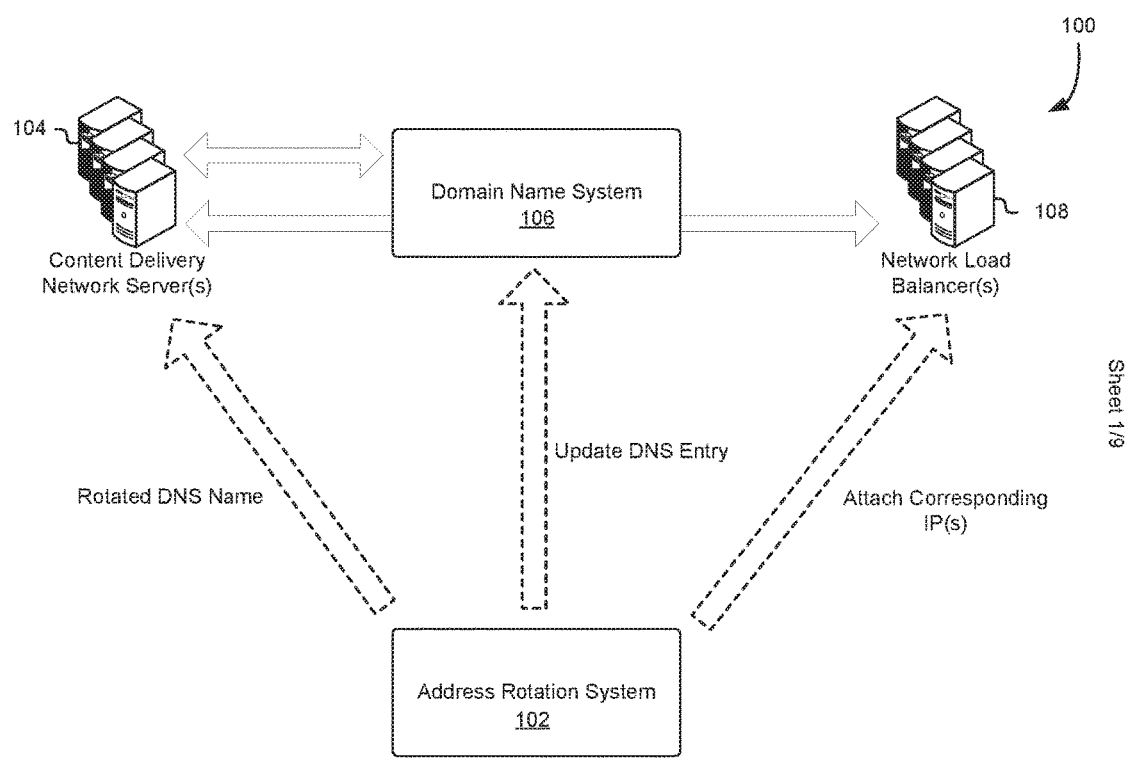
FIG. 1 shows an illustrative example of a system in which various embodiments can be implemented.

Techniques described and suggested herein relate to the rotation of DNS names and corresponding IP addresses for a set of network load balancers associated with a set of origin servers provided by a service. In an example, an address rotation system provisioned by a service provider for use between its CDN servers and origin servers operating within a network detects a triggering event for initiating rotation of the DNS name of a set of origin servers and corresponding IP addresses for a set of network load balancers that enable access to the origin servers. The triggering event may include the passing of a pre-determined period of time or the detection of suspicious activity that may impact the operation of the origin servers, the network load balancers, and/or the CDN servers. In response to this triggering event, the address rotation system may query the CDN servers to identify an active CDN route for these CDN servers. This active CDN route may correspond to a DNS name of the origin servers and the IP addresses associated with the DNS name, as maintained in a DNS entry. Additionally, the address rotation system may initiate removal of any inactive CDN routes (e.g., DNS names and corresponding IP addresses no longer in use).

In an example, the service provider maintains various sub-networks (sets) of network load balancers, of which an active set of network load balancers processes incoming requests from the CDN servers to access the origin servers. The service provider may also maintain a staged set of network load balancers and a set of drainage sets of network load balancers. If the address rotation system determines that the DNS names and corresponding IP addresses attached to the drainage sets are no longer utilized (e.g., processing of pending requests has been completed), the address rotation system may remove the DNS entries corresponding to these DNS names and corresponding IP addresses from the DNS and also clear the CDN routes associated with these DNS entries. Further, the address rotation system may clear the state corresponding to the active DNS route and initiate rotation of the various network load balancer sets.

In an example, the address rotation system selects a new set of IP addresses for the staged set of network load balancers, which is to be rotated into active status for the network. The address rotation system may attach these new IP addresses to the staged set of network load balancers. Additionally, the address rotation system may generate a randomized DNS name for the origin servers. For instance, the address rotation system may select a randomized string of alphanumeric characters to serve as the machine name that is to be part of the domain name for the origin servers. This randomized string of alphanumeric characters may be generated to have a requisite level of complexity such that a user would be unable to arrive at this randomized string through brute force techniques before the next rotation is to take place. Using the new set of IP addresses and DNS name, the address rotation system may generate a new DNS entry within the DNS corresponding to the origin servers. In an example, the address rotation system transmits the newly generated DNS name to the CDN servers to cause these CDN servers to utilize this newly generated DNS name to submit requests to the DNS to obtain an IP address of a network load balancer for accessing the origin servers. The address rotation system may query the CDN servers to ensure that the update of the DNS name was processed successfully by the CDN servers. If the update of the CDN servers and the DNS has been completed successfully, the address rotation system may set the staged set of network load balancers to an active state while transitioning the previously active set of network load balancers to a drainage state and the oldest drainage set of network load balancers to a staged state.

In an example, the address rotation system queries a provider of the CDN servers to identify the active range of IP addresses for the CDN servers that may access the origin servers provided by the service provider. If the address rotation system determines that a new active range of IP addresses is being utilized by the CDN servers, the address rotation system may provide this new range of IP addresses to the various network load balancer sets and clear any previously recorded range of IP addresses from the various network load balancer sets. Thus, in response to a request from a CDN server to access an origin server to obtain content, the active set of network load balancers may determine whether the IP address of the CDN server is within the active range of IP addresses provided by the CDN provider. If the IP address of the CDN server is not within the active range of IP addresses, the active set of network load balancers may reject the request. Otherwise, the active set of network load balancers and the CDN server may establish an SSL connection to enable the CDN server to access the origin servers and obtain the requested content.

As one skilled in the art will appreciate in light of this disclosure, certain embodiments may be capable of achieving certain advantages. For instance, because the address rotation system automatically rotates the DNS name and corresponding IP addresses for the network load balancers and the origin servers within a pre-determined period of time, the risk of a malicious attack on the fleet of origin servers is reduced. Further, as noted above, the selection of a randomized alphanumeric string as the machine name of the DNS name makes it increasingly difficult for any entity to obtain this alphanumeric string, using brute force techniques, prior to the next rotation cycle of the address rotation system. Continuous updates of the active IP addresses for the CDN servers also makes it more difficult for malicious entities to spoof the IP of a CDN server and access the origin servers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, an address rotation system 102 detects a triggering event that causes the address rotation system 102 to initiate a process for rotating the IP addresses of a set of network load balancers 108 that control network traffic to a set of origin servers of a particular service. Additionally, the address rotation system 102, through this initiated process, may identify a new DNS name corresponding to newly assigned IP addresses generated through the rotation of the IP addresses of the set of network load balancers 108. The address rotation system 102, in an embodiment, comprises a collection of computing resources that collectively operate to monitor the state of the network wherein the CDN servers 104 and the network load balancers 108 operate to enable access to a set of origin servers that may make available content that may be cached by the CDN servers 104 for use by various client devices. For instance, a user of a client device may, through a browser application installed on the client device, provide a URL of a website provided by the set of origin servers. A DNS between the client device and the CDN servers 104 may obtain the URL from the client device and identify, from a DNS entry corresponding to the URL, an IP address of a CDN server 104 that may fulfill the request. The DNS may provide the IP address to the client device, which may use the IP address to establish a communications session with a CDN server 104 to obtain the data required to provide the requested website to the user through the browser application. While CDN servers and CDN server providers are described extensively throughout the present disclosure for the purpose of illustration, it should be noted that alternatives to CDN servers and CDN server providers may be utilized. For instance, servers operating within distributed networks other than CDNs may be utilized. Additionally, while network load balancers are used and described throughout the present disclosure for the purpose of illustration, other systems and resources may be utilized, such as application load balancers, proxy servers, physical or virtualized hosts, and the like.

In an embodiment, the address rotation system 102 functions as a state machine that tracks the state of various network load balancer sets within the network. For instance, the network load balancers 108 may be grouped into individual sets that may serve different purposes. An active set of network load balancers of the network load balancers 108 may process incoming requests from various CDN servers 104 to access the set of origin servers and to obtain data from these origin servers. This active set of network load balancers may be assigned with a set of IP addresses corresponding to a DNS name of the origin servers. This correspondence between the set of IP addresses and the DNS name may be specified in a DNS entry within a DNS 106 of the network. For instance, a CDN server 104 may submit, to the DNS 106, the DNS name of the set of origin servers. In response to this submission, the DNS 106 may identify the DNS entry associated with the provided DNS name and, from the entry, obtain an IP address assigned to the active set of network load balancers. The CDN server 104 may use this IP address to access the active set of network load balancers and establish an SSL session with a network load balancer of the active set to access the set of origin servers.

In an embodiment, the address rotation system 102 provisions a set of containers to perform rotation of the IP addresses of the network load balancers 108 and the DNS name of the origin servers that are associated with the network load balancers 108. A "container," as referred to herein, packages up code and all its dependencies so an application (also referred to as a task) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of software containers, a "task" refers to a container, or multiple containers working together, running to execute the functionality of a software application or a particular component of that application. In some implementations, tasks can also include virtual machines, for example virtual machines running within an instance that hosts the container(s). A "task definition" can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In an embodiment, the address rotation system 102 detects, from a computing resource monitoring service, a triggering event that indicates a need to rotate the DNS name of the origin servers and the IP addresses of the network load balancers 108. For instance, the computing resource monitoring service may monitor the performance of the network load balancers 108 and the DNS 106 within the network to identify any issues that may need to be addressed. In some examples, the computing resource monitoring service may generate an indication that a pre-determined amount of time has elapsed during which the active DNS name of the origin servers and the corresponding IP addresses of the active set of network load balancers have been utilized within the network. Alternatively, the computing resource monitoring service may generate an indication that it has detected suspicious activity within the network (e.g., a malicious entity purporting to be a CDN server 104 has attempted to access the network load balancers 104 and the origin servers, etc.). This indication may be stored within a queue or other repository accessible by the address rotation system 102. The address rotation system 102 may detect this indication and determine that the triggering event has occurred.

In response to the triggering event, the address rotation system 102 may query a control plane of the CDN servers 104 to identify the active CDN route for the CDN servers 104 to access the network load balancers 108 and the origin servers. The identification of the active CDN route may result in identification of the active DNS name of the origin servers used by the CDN servers 104 to query the DNS 106 and of the active IP addresses corresponding to the active set of network load balancers to which the CDN servers 104 may establish an SSL session for accessing the origin servers. For instance, the address rotation system 102 may use network identifiers corresponding to the active IP addresses to identify the active set of network load balancers that are processing incoming requests to access the set of origin servers in the network. In an embodiment, the address rotation system 102 determines, from the network load balancers 108, whether there are any inactive CDN routes. For instance, the network load balancers 108 may include one or more drainage sets of network load balancers that may be processing any pending requests obtained prior to activation of the active set of network load balancers and of the active CDN route (e.g., active DNS name and corresponding IP addresses). If any of the one or more drainage sets of network load balancers has completed processing of its pending requests, the address rotation system 102 may determine that the corresponding CDN route is now inactive. As a result, the address rotation system 102 may release the inactive DNS name and corresponding IP addresses.

In an embodiment, in response to removal of the inactive routes corresponding to the one or more drainage sets of network load balancers, the address rotation system 102 may clear the state corresponding to the active CDN route. For instance, the address rotation system 102 may prepare a staged set of network load balancers for rotation to an active state and ensure that drainage of the drainage sets of network load balancers has been completed. Further, the address rotation system 102 may remove, from the DNS 106, a DNS entry corresponding to the DNS name of the origin servers and the corresponding IP addresses of the network load balancers of the active set of network load balancers. If this process has been completed successfully, the address rotation system 102 may initiate rotation of the various sets of network load balancers of the fleet of network load balancers 108. For instance, in an embodiment, the address rotation system 102 obtains, from a pool of available IP addresses, a set of IP addresses that are to be attached to the network load balancers of the staged set of network load balancers. The pool of available IP addresses may be maintained by the service provider that provides the fleet of network load balancers 108 and the origin servers. Alternatively, the pool of available IP addresses may be associated with an account of an entity that provides the origin servers and the network load balancers 108 through a virtual private network provisioned through a computing resource service provider.

The address rotation system 102 may attach the selected IP addresses from the pool of available IP addresses to the network load balancers of the staged set of network load balancers. In an embodiment, the address rotation system 102 further accesses the DNS 106 to generate a new DNS entry that can be used by the DNS 106 to route the CDN servers 104 to the network load balancers 108. To generate the new DNS entry, the address rotation system 102 creates a new DNS name for the origin servers. In an embodiment, the address rotation system 102 generates a random alphanumeric character string that is to serve as the machine name within the DNS name for the origin servers. For example, the origin servers may maintain a common domain name and domain name extension (e.g., "example.com") while the machine name may be variable. The length of the random alphanumeric character string may be subject to the limitations specified in Internet Engineering Task Force Request for Comments (RFC) 1035, which is hereby incorporated in its entirety by reference. Further, the length of the random alphanumeric character string may be selected such that it may be difficult for another entity, using brute force techniques, to obtain the machine name of the DNS name within the pre-determined period of time for rotation of the DNS name of the origin servers and IP addresses of the network load balancers 108. The address rotation system 102 may use the newly created DNS name in the DNS entry generated in the DNS 106 to associate this newly created DNS name with the selected IP addresses obtained from the pool of available IP addresses. It should be noted that while DNS naming conventions are described extensively throughout the present disclosure for the purpose of illustration, other naming conventions for the origin servers may be used. For instance, an alternative naming convention may be implemented that may support characters other than alphanumeric characters for the character string that may be associated with the origin servers.

In an embodiment, the address rotation system 102 transmits a message to the CDN server control plane to provide the CDN servers 104 with the newly created DNS name for the origin servers. This may cause the CDN servers 104 to establish a new active CDN route for accessing the origin servers through the network load balancers 108. The address rotation system 102 may query the CDN server control plane to determine whether the update to the CDN servers 104 was completed successfully. If the update was not completed successfully, the address rotation system 102 may revert to the previously utilized DNS name and corresponding IP addresses and await a new triggering event for rotation of the machine name of the DNS name and the IP addresses of the network load balancers 108. However, if the update of the CDN servers 104 is completed successfully, the address rotation system 102 may rotate the various sets of the network load balancers 108. For instance, the address rotation system 102 may transition the active set of network load balancers to a "drainage" state, whereby these network load balancers may continue to process any pending requests to access the origin servers from CDN servers 104 that utilized the now inactive DNS name and corresponding IP addresses. Further, the address rotation system 102 may rotate the staged set of the network load balancers to an "active" state, whereby the network load balancers of this set may process incoming requests from CDN servers 104 to access the origin servers. For instance, if a CDN server 104 submits, to the DNS 106, the DNS name of the origin servers, the DNS 106 may identify the DNS entry generated by the address rotation system 102 corresponding to the provided DNS name. From this DNS entry, the DNS 106 may identify the IP addresses of the active set of network load balancers and select, from these IP addresses, an IP address to be provided to the CDN server 104. The CDN server 104 may obtain, from the DNS 106, this IP address and utilize the IP address to access a network load balancer of the active set of network load balancers.

In an alternative embodiment, rather than the address rotation system 102 providing the newly created DNS name for the origin servers to the CDN servers 104 to allow the CDN servers 104 to use the DNS name to query the DNS 106 to obtain the IP addresses of the active set of network load balancers, the active set of network load balancers may provide the IP addresses of the active set of network load balancers directly to the CDN servers 104. Thus, the address rotation system 102 need not depend on the DNS 106, in this particular example, to make available the IP addresses to the CDN servers 104. Further, this may obviate the need to generate a new DNS name for the origin servers and to create a new DNS entry within the DNS 106 to associate the DNS name for the origin servers to the IP addresses attached to the active set of network load balancers.

In an embodiment, the address rotation system 102 queries the CDN server control plane or a service that provides the CDN servers 104 to identify an active range of IP addresses utilized by the CDN servers 104. These IP addresses may be rotated by the CDN server control plane or service after a pre-determined period of time has elapsed. Thus, the address rotation system 102 may periodically or in response to a triggering event (e.g., detection of an indication that specifies a need to rotate the DNS name and corresponding IP addresses of the network load balancers 108, etc.) query the CDN server control plane or service to obtain the active range of IP addresses used by the CDN servers 104. The address rotation system 102 evaluates the provided active range of IP addresses to determine whether the provided range of IP addresses is new. For instance, if the active range of IP addresses matches a range of IP addresses previously obtained by the address rotation system 102, the address rotation system 102 may determine that the previously obtained range of IP addresses is still active. As a result, the address rotation system 102 may continue to use this range of IP addresses and await another triggering event for submitting a new query to the CDN server control plane or service.

If the address rotation system 102 determines that the active range of IP addresses obtained from the CDN server control plane or service includes one or more IP addresses in use by the CDN servers 104, the address rotation system 102 may provide this active range of IP addresses to the network load balancers 108. Further, the address rotation system 102 may clear any previously recorded range of IP addresses of the CDN servers 104 from the network load balancers 108.

In an embodiment, a network load balancer evaluates the IP address of a CDN server 104 in response to a request from the CDN server 104 to access an origin server of the network. If the IP address of the CDN server 104 is within the active range of IP addresses provided by the address rotation system 102, the network load balancer may determine that the request is from a valid CDN server 104 and continue processing the request. However, if the IP address of the CDN server 104 is not within the active range of IP addresses for valid CDN servers, the network load balancer may deny the request, as the CDN server 104 cannot be validated as being associated with the trusted CDN server control plane or service. In an embodiment, if the CDN server 104 has an IP address within the active range of IP addresses provided by the CDN server control plane or service, the network load balancer may transmit, to the CDN server 104, an SSL digital certificate that includes a public cryptographic key of a cryptographic key pair to initiate an SSL handshake for establishing a secure communications session between the CDN server 104 and the network load balancer. The SSL digital certificate may specify the DNS name of the origin servers using a wildcard character in place of the randomized alphanumeric character string previously provided by the address rotation system 102 to the CDN servers 104. For instance, the SSL digital certificate may identify the DNS name as "*.example.com" in place of the complete machine name generated by the address rotation system 102. This may allow the CDN server 104 to authenticate the SSL digital certificate without the network load balancer having to issue a new SSL digital certificate each time a new randomized string of alphanumeric characters is generated by the address rotation system 102 and used for the new DNS name of the origin servers. It should be noted that while SSL is used extensively throughout the present disclosure for the purpose of illustration, other protocols may be used to establish a secure communications session between the CDN server 104 and the network load balancers 108.

Figure 2:
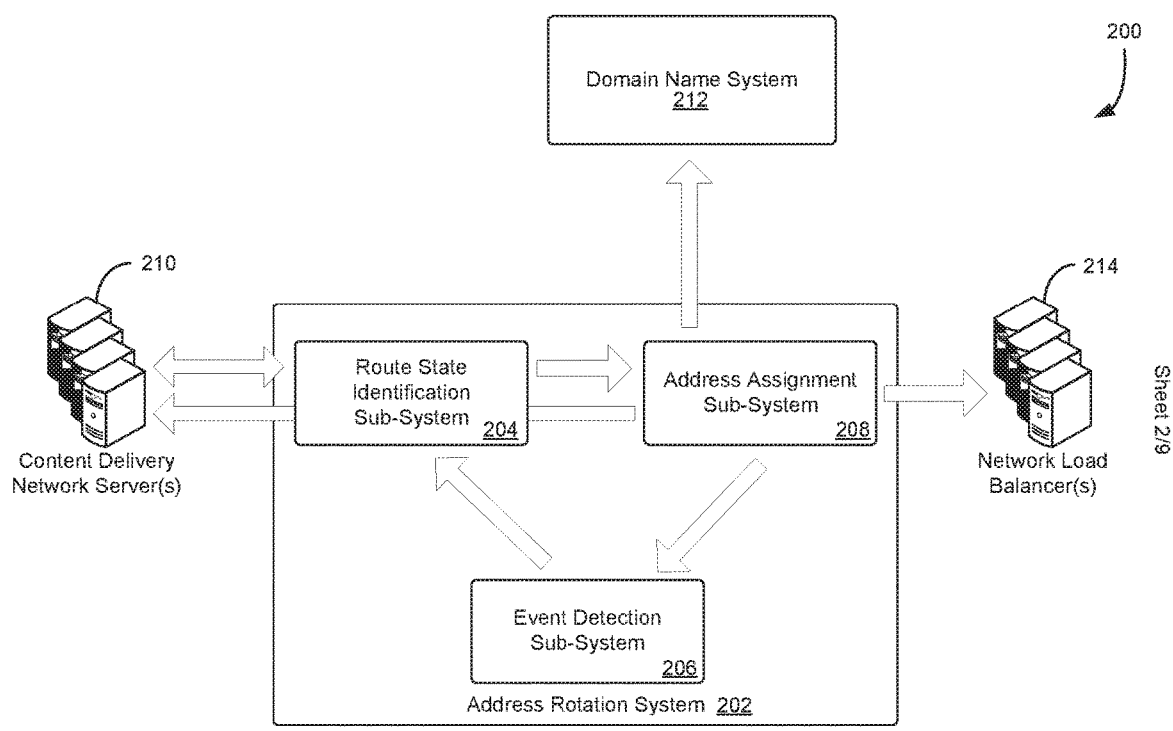
FIG. 2 shows an illustrative example of a system in which an address rotation system generates a new DNS entry and Internet Protocol (IP) addresses for a set of network load balancers associated with a set of origin servers in accordance with at least one embodiment.

FIG. 2 shows an illustrative example of a system 200 in which an address rotation system 202 generates a new DNS entry and IP addresses for a set of network load balancers 214 associated with a set of origin servers in accordance with at least one embodiment. In the system 200, an event detection sub-system 206 of the address rotation system 202 detects a triggering event that causes the event detection sub-system 206 to initiate a process for rotating the IP addresses of the network load balancers 214 and the DNS name for the origin servers associated with the network load balancers 214. The event detection sub-system 206 is implemented using hardware and software of the address rotation system 202 or abstraction thereof (such as one or more virtual machines operating via a hypervisor) and can comprise one or more processors and memory that stores executable instructions whose execution by the one or more processors causes the computer system to perform operations described herein. In an embodiment, the event detection sub-system 206 queries a computing resource monitoring service to determine whether an event has been created indicating a need to initiate rotation of the IP addresses of the network load balancers 214 and the DNS name of the origin servers. For instance, the computing resource monitoring service may periodically generate an event after a predetermined period of time has elapsed. Alternatively, the computing resource monitoring service may generate an event in response to detection of an issue within the network, such as detection of suspicious activity within the network, the unauthorized access to resources provided through the network, and the like. In some instances, the event detection sub-system 206 may perform the functions of the computing resource monitoring service described above.

If the event detection sub-system 206 detects a triggering event for rotation of the IP addresses of the network load balancers 214 and of the DNS name of the origin servers, the event detection sub-system 206 may transmit a request to a route state identification sub-system 204 of the address rotation system 202 to identify the active CDN route utilized by the various CDN servers 210 for accessing the origin servers through the network load balancers 214. Similar to the event detection sub-system 206, the route state identification sub-system 204 is implemented using hardware and software of the address rotation system 202 or abstraction thereof (such as one or more virtual machines operating via a hypervisor) and can comprise one or more processors and memory that stores executable instructions whose execution by the one or more processors causes the computer system to perform operations described herein.

In response to the request from the event detection sub-system 206, the route identification sub-system 204 may query a control plane of the CDN servers 210 and/or a service that provides and maintains the CDN servers 210 to determine the active CDN route utilized by the CDN servers 210 to access the network load balancers 214 and the origin servers. As noted above, the identification of the active CDN route may result in identification of the active DNS name of the origin servers used by the CDN servers 210 to query the DNS 212 and of the active IP addresses corresponding to the active set of network load balancers to which the CDN servers 210 may establish an SSL session or other encrypted communications session for accessing the origin servers. The route state identification sub-system 204 may use network identifiers corresponding to the active IP addresses to identify the active set of network load balancers that are processing incoming requests to access the set of origin servers in the network.

In an embodiment, the route state identification sub-system 204 transmits, to an address assignment sub-system 208 of the address rotation system 202, the active DNS name for the origin servers, as well as the active IP addresses corresponding to the active set of network load balancers. The address assignment sub-system 208 is implemented using hardware and software of the address rotation system 202 or abstraction thereof (such as one or more virtual machines operating via a hypervisor) and can comprise one or more processors and memory that stores executable instructions whose execution by the one or more processors causes the computer system to perform operations described herein. Additionally, the route state identification sub-system 204 may determine whether there are any inactive CDN routes. For instance, the network load balancers 214 may include one or more drainage sets of network load balancers that may be processing any pending requests obtained prior to activation of the active set of network load balancers and of the active CDN route (e.g., active DNS name and corresponding IP addresses). If any of the one or more drainage sets of network load balancers have completed processing of its pending requests, the route state identification sub-system 204 may determine that the corresponding CDN route is inactive and release the inactive DNS name and corresponding IP addresses associated with the drainage set. Further, the route state identification sub-system 204 may clear the state corresponding to the active CDN route in order to signal that rotation of the various sets of network load balancers, the DNS name of the origin servers, and the IP addresses that are to be activated for use by a new active set of network load balancers may commence.

The address assignment sub-system 208 may obtain a notification or other indication from the route state identification sub-system 204 that new IP addresses may be allocated to the network load balancers 214 and a new DNS name may be assigned to the origin servers. In response to this notification or other indication, the address assignment sub-system 208 may select, from a pool of available IP addresses, a set of IP addresses that may be assigned to a staged set of network load balancers. The address assignment sub-system 208 may attach the selected IP addresses to the staged set of network load balancers. Additionally, the address assignment sub-system 208 may generate a new DNS name for the origin servers associated with the network load balancers 214. In an embodiment, the address assignment sub-system 208 generates a random alphanumeric string of characters that may be used as a machine name within the DNS name for the origin servers. For instance, the address assignment sub-system 208 may maintain a common domain name and domain name extension (e.g., "example.com") for the origin servers while the changing the machine name during every rotation cycle. As noted above, the length of the random alphanumeric character string may be selected such that it may be difficult for another entity, using brute force techniques, to obtain the active DNS name of the origin servers within the predetermined period of time for rotation of the DNS name of the origin servers and IP addresses of the network load balancers 214.

The address assignment sub-system 208 may access the DNS 212 to generate a new DNS entry for the origin servers. This new DNS entry may specify the newly created DNS name of the origin servers, as well as the selected IP addresses assigned to the staged set of network load balancers. If the DNS entry is created successfully in the DNS 212, the address assignment sub-system 208 may transmit a notification to a control plane or service that maintains the CDN servers 210 to provide the new DNS name of the origin servers for use by the CDN servers 210 to submit requests to access the network load balancers 214 and, through the network load balancers 214, the origin servers. In response to obtaining this notification, the control plane or service that maintains the CDN servers 210 may update the CDN servers 210 to cause these CDN servers 210 to utilize the provided DNS name to submit requests to access the origin servers through the network load balancers 214. The address assignment sub-system 208 may query the control plane or service to determine whether the update of the CDN servers 210 was completed successfully. If the update was not successfully completed, the address assignment sub-system 208 may maintain the previous DNS entry and cease the rotation process. Thus, the CDN servers 210 may use the previously used DNS name to access the origin servers through the network load balancers 214. Further, the staged set of network load balancers may remain in the "staged" state while the active set of network load balancers continue processing incoming requests.

If the update of the CDN servers 210 was completed successfully, the address assignment sub-system 208 may rotate the various sets of the network load balancers 214. For instance, the address assignment sub-system 208 may transition the active set of network load balancers to a "drainage" state, whereby these network load balancers may continue to process any pending requests to access the origin servers from CDN servers 210 that utilized the now inactive DNS name and corresponding IP addresses. Further, the address assignment sub-system 208 may rotate the staged set of the network load balances to an "active" state, whereby the network load balancers of this set may process incoming requests from CDN servers 210 to access the origin servers. For instance, if a CDN server 210 submits, to the DNS 212, the DNS name of the origin servers, the DNS 212 may identify the DNS entry generated by the address assignment sub-system 208. From this DNS entry, the DNS 212 may identify the IP addresses of the active set of network load balancers and select, from these IP addresses, an IP address to be provided to the CDN server 210. The CDN server 210 may obtain, from the DNS 212, this IP address and utilize the IP address to access a network load balancer of the active set of network load balancers. The address assignment sub-system 208 may transmit a notification to the event detection sub-system 206 to indicate that the rotation of the DNS name, IP addresses, and sets of the network load balancers 214 has been completed successfully. The event detection sub-system 206 may thus initiate a timer or other mechanism to determine when the next rotation is to occur.

In an embodiment, the address assignment sub-system 208 transmits a request to a control plane of the CDN servers 210 or to a service that provisions and maintains the CDN servers 210 to determine an active range of IP addresses for the CDN servers 210. The control plane of the CDN servers 210 or the service that provisions and maintains the CDN servers 210 may, periodically or in response to a triggering event (e.g., indication of suspicious activity, etc.), rotate the range of IP addresses assigned to the CDN servers 210. In response to the request from the address assignment sub-system 208, the control plane or service may provide, to the address assignment sub-system 208, the active range of IP addresses for the CDN servers 210. The address assignment sub-system 208 may evaluate the obtained active range of IP addresses to determine whether this active range of IP addresses differs from a previously obtained range of IP addresses from the control plane or service. If there is no difference, the address assignment sub-system 208 may wait for another triggering event or for a pre-determined period of time to elapse in order to again query the control plane or service to determine whether a new active range of IP addresses has been used for the CDN servers 210.

If the address assignment sub-system 208 determines that the obtained active range of IP addresses differs from a previously obtained range of IP addresses, the address assignment sub-system 208 may provide this newly active range of IP addresses to the network load balancers 214. This may cause the network load balancers 214 to remove any previously obtained range of IP addresses of the CDN servers 210 and to implement this newly active range of IP addresses. In response to a request from a CDN server 210 to establish a secure communications session with a network load balancer 214 and to access the origin servers, the network load balancer 214 may identify the IP address of the CDN server 210 and determine whether this IP address is within the active range of IP addresses provided by the CDN server control plane or service through the address assignment sub-system 208. If the IP address of the CDN server 210 is within the active range of IP addresses, the network load balancer 214 may establish the secure communications session with the CDN server 210 and allow the CDN server 210 to access the origin servers. However, if the IP address of the CDN server 210 is not within the active range of IP addresses, the network load balancer 214 may deny the request. Further, the network load balancer 214 may transmit a notification to a service provider that provides the origin servers and/or to the service that provisions the CDN servers 210 to indicate that a server purporting to be a CDN server 210 has attempted to gain access to the origin servers.

Figure 3:
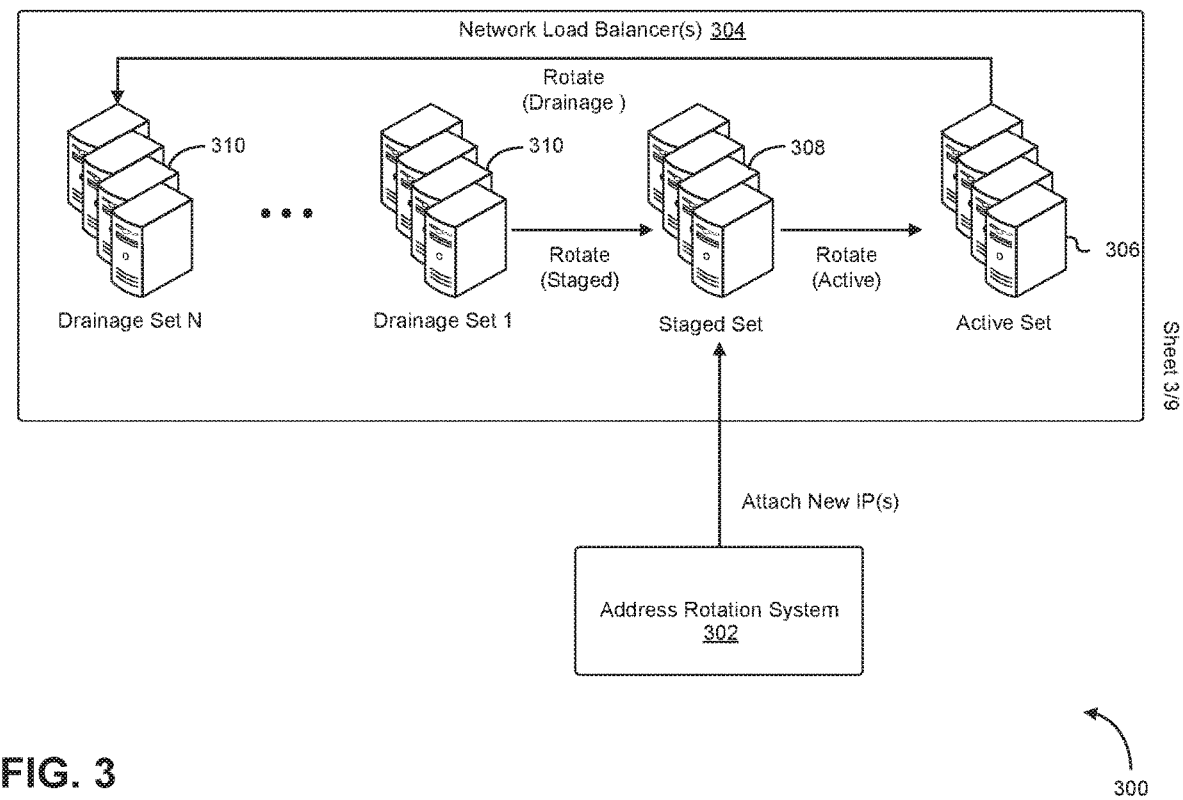
FIG. 3 shows an illustrative example of a system in which an address rotation system assigns a new set of IP addresses to a staged set of network load balancers and initiates rotation of other sets of network load balancers in accordance with at least one embodiment.

FIG. 3 shows an illustrative example of a system 300 in which an address rotation system 302 assigns a new set of IP addresses to a staged set of network load balancers 308 and initiates rotation of other sets of network load balancers 306, 310 in accordance with at least one embodiment. As noted above, the network load balancers 304 may be organized into separate sets of network load balancers. For instance, the network load balancers 304 may include an active set of network load balancers 306 that may process incoming requests from CDN servers and other entities to access the origin servers. The active set of network load balancers 306 may be assigned with a set of IP addresses that may be used to access the active set of network load balancers 306 over a communications network, such as the Internet. This set of IP addresses may be specified in a DNS entry maintained by a DNS. Within the DNS entry, the set of IP addresses of the active set of network load balancers 306 may be associated with a DNS name for the origin servers. This DNS name may include, as a machine name, a randomized string of alphanumeric characters generated by the address rotation system 302. Thus, if a CDN server submits a request to identify an IP address corresponding to this DNS name, the DNS may provide the CDN server with an IP address of a network load balancer of the active set of network load balancers 306.

The network load balancers 304 may also include one or more drainage sets of network load balancers 310. The drainage sets of network load balancers 310 may process any pending requests obtained prior to activation of the active set of network load balancers 306 and of the active CDN route (e.g., active DNS name and corresponding IP addresses). The address rotation system 302 may monitor these drainage sets of network load balancers 310 to determine whether any of the one or more drainage sets of network load balancers 310 have completed processing of its pending requests. If so, the address rotation system 302 may determine that the corresponding CDN route is now inactive. As a result, the address rotation system 302 may release the inactive DNS name and corresponding IP addresses of the drainage set of network load balancers 310.

In an embodiment, the network load balancers 304 include a staged set of network load balancers 308. The staged set of network load balancers 308 may be utilized by the address rotation system 302 in anticipation of the staged set of network load balancers 308 being rotated into an "active" state, thereby becoming the new active set. For instance, as part of the rotation process, the address rotation system 302 may remove, from the DNS, a DNS entry corresponding to the DNS name of the origin servers and the corresponding IP addresses of the active set of network load balancers 306. The address rotation system 302 may obtain, from a pool of available IP addresses, a set of IP addresses that are to be attached to the network load balancers of the staged set of network load balancers 308. The address rotation system 302 may attach the selected IP addresses from the pool of available IP addresses to the network load balancers of the staged set of network load balancers 308. Further, the address rotation system 302 may access the DNS to generate a new DNS entry that can be used by the DNS to route the CDN servers to the network load balancers 304. The address rotation system 302 may use a newly created DNS name in the DNS entry generated in the DNS to associate this newly created DNS name with the selected IP addresses obtained from the pool of available IP addresses.

As noted above, the address rotation system 302 may transmit a message to the CDN server control plane to provide the CDN servers with the newly created DNS name for the origin servers. This may cause the CDN servers to establish a new active CDN route for accessing the origin servers through the network load balancers 304. If the update of the CDN servers is completed successfully, the address rotation system 302 may rotate the various sets of the network load balancers. For instance, the address rotation system 302 may transition the active set of network load balancers 306 to a "drainage" state, whereby these network load balancers may continue to process any pending requests to access the origin servers from CDN servers that utilized the now inactive DNS name and corresponding IP addresses. Further, the address rotation system 302 may rotate the staged set of the network load balancers 308 to an "active" state, whereby the network load balancers of this set may process incoming requests from CDN servers to access the origin servers. For instance, if a CDN server submits, to the DNS, the DNS name of the origin servers, the DNS may identify the DNS entry generated by the address rotation system 302 corresponding to the provided DNS name. From this DNS entry, the DNS may identify the IP addresses of the active set of network load balancers and select, from these IP addresses, an IP address to be provided to the CDN server. The CDN server may obtain, from the DNS, this IP address and utilize the IP address to access a network load balancer of the now active set of network load balancers.

Figure 4:
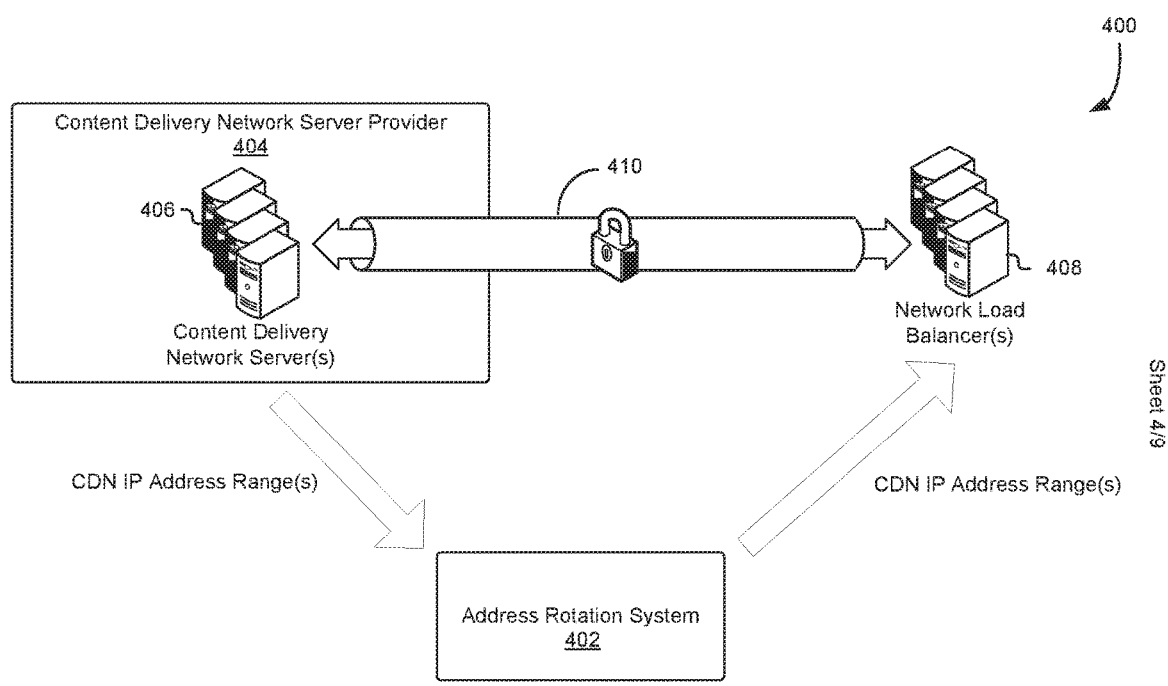
FIG. 4 shows an illustrative example of a system in which an address rotation system obtains a set of CDN IP address ranges and provides this set of CDN IP address ranges to the set of network load balancers to enable the network load balancers to determine whether a Secure Sockets Layer (SSL) session can be established with a CDN server in accordance with at least one embodiment.

FIG. 4 shows an illustrative example of a system 400 in which an address rotation system 402 obtains a set of CDN IP address ranges and provides this set of CDN IP address ranges to the set of network load balancers 408 to enable the network load balancers 408 to determine whether an SSL session can be established with a CDN server 406 in accordance with at least one embodiment. As noted above, an address rotation system 402 may query a CDN server provider 404 (e.g., a service, control plane, etc.) that maintains a fleet of CDN servers 406 authorized to access the origin servers to identify a set of active ranges of IP addresses corresponding to the IP addresses assigned to each of the CDN servers 406. This query may be performed by the address rotation system 402 in conjunction with the rotation of the DNS name of the origin servers and the IP addresses of the network load balancers 408. Alternatively, the query may be performed by the address rotation system 402 in response to a triggering event. For instance, if the address rotation system 402 obtains an indication that suspicious activity has been detected within the network, the address rotation system 402 may query the CDN server provider 404 to identify the current set of active ranges of IP addresses for the CDN servers 406. In some instances, the CDN server provider 404 may provide the set of active ranges of IP addresses to the address rotation system 402 as a result of rotation of the IP addresses of the CDN servers 406. Thus, the address rotation system 402 may obtain the set of active ranges of IP addresses for the CDN servers 406 from the CDN server provider 404 without submitting a query to the CDN server provider 404. While active ranges of IP addresses are described extensively throughout the present disclosure for the purpose of illustration, other information may be provided by the CDN server provider 404 that can be used by the network load balancers 408 to determine that network traffic is from a valid CDN server 406. This other information may include credential information that may be used by a network load balancer to authenticate the CDN server 406 in response to a request to access an origin server.

In response to obtaining the set of active ranges of IP addresses for the CDN servers 406, the address rotation system 402 may determine whether this set of active ranges of IP addresses differs from a previously obtained set of active ranges of IP addresses utilized by the network load balancers 408 to determine whether a request to access the origin servers was submitted by a legitimate CDN server 406. For instance, the address rotation system 402 may compare the set of active ranges of IP addresses from the CDN server provider 404 to the previously obtained set of active ranges of IP addresses to determine whether there is a match. If there is a match, the address rotation system 402 may determine that the network load balancers 408 are utilizing the current set of active ranges of IP addresses for identifying legitimate CDN servers 406. However, if the sets do not match, the address rotation system 402 may provide the newly obtained set of active ranges of IP addresses to the network load balancers 408. This may cause the network load balancers 408 to remove any entries corresponding to the previously obtained set of active ranges of IP addresses and replace these entries with new entries corresponding to the newly obtained set of active ranges of IP addresses for the CDN servers 406. The address rotation system 402 may also record the newly obtained set of active ranges of IP addresses for the CDN servers 406 in order to perform future comparisons as a result of obtained additional sets from the CDN server provider 404.

At any time, a network load balancer 408 may obtain a request from a CDN server 406 to establish an SSL session 410 or other secure communications session to allow the CDN server 406 to access the origin servers. In response to the request, the network load balancer 408 may identify the IP address of the CDN server 406 and determine whether this IP address is within the set of active ranges of IP addresses for the CDN servers 406 that was provided by the CDN server provider 404 through the address rotation system 402. If the IP address of the CDN server 406 is not within the set of active ranges of IP addresses for the CDN servers 406, the network load balancer 408 may deny the request. Further, the network load balancer 408 may transmit a notification to the address rotation system 402 and/or to the CDN server provider 404 to indicate that the network load balancer 408 has obtained a request from a server or other entity purporting to be a CDN server 406 provided by the CDN server provider 404. This may cause the address rotation system 402 and the CDN server provider 404 to perform one or more remedial actions. For instance, in response to this notification, the address rotation system 402 may initiate another rotation cycle to change the DNS name of the origin servers and the IP addresses of the network load balancers 408, as described above.

If the IP address of the CDN server 406 is within the set of active ranges of IP addresses for the CDN servers 406 provided by the CDN server provider 404, the network load balancer 408 may provide a digital certificate to the CDN server 406. This digital certificate may specify the DNS name of the origin servers, using a wildcard character in place of the randomized alphanumeric character string previously provided by the address rotation system 402 to the CDN servers 406. For instance, the digital certificate may identify the DNS name as "*.example.com," where "*" is a wildcard character used in place of the complete machine name generated by the address rotation system 402. This may allow the CDN server 406 to authenticate the digital certificate and the network load balancer 408 without the network load balancer 408 having to issue a new digital certificate each time a new randomized string of alphanumeric characters is generated by the address rotation system 402 and used for the new DNS name of the origin servers. The CDN server 406 and the network load balancer 408 may establish, through an SSL handshake process, the SSL session 410 to allow the CDN server 406 to access the origin servers.

Figure 5:
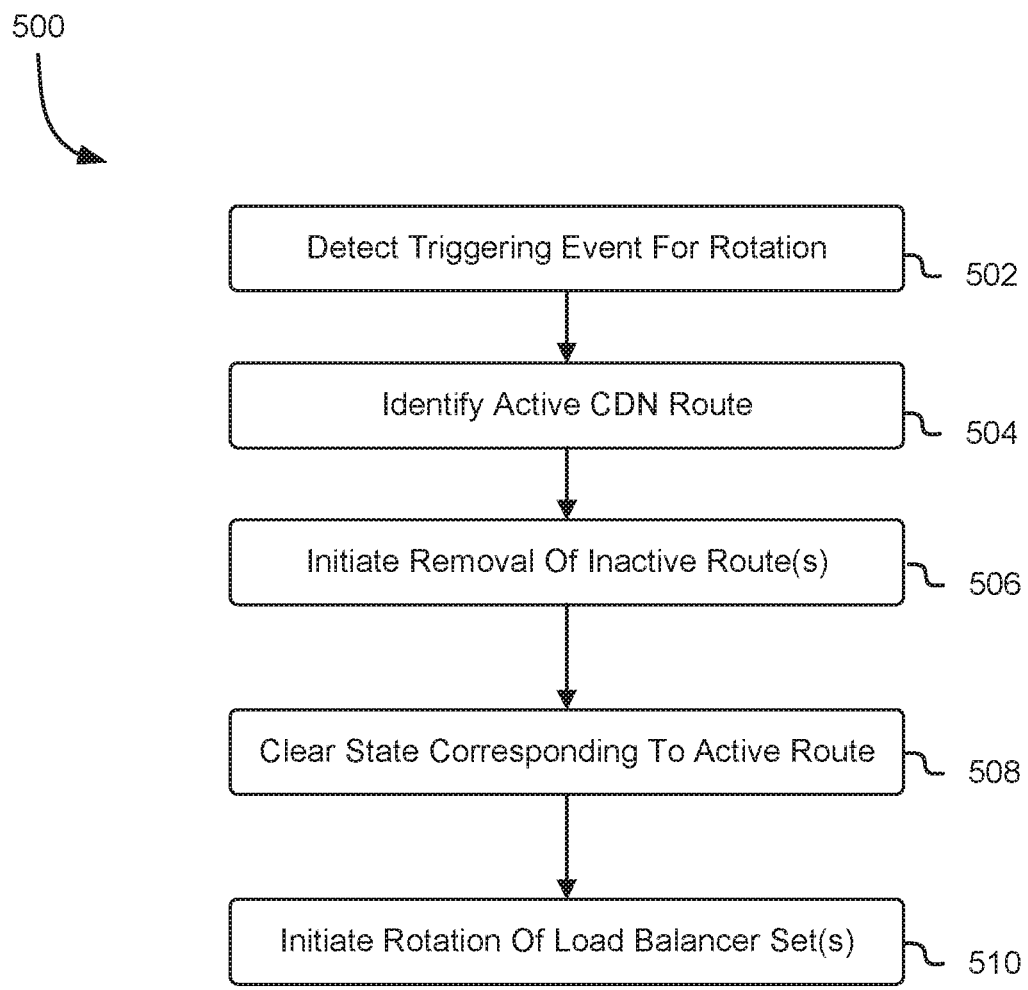
FIG. 5 shows an illustrative example of a process for clearing the state corresponding to an active CDN route to initiate rotation of the network load balancer sets and network addresses of the network load balancer sets in accordance with at least one embodiment.

FIG. 5 shows an illustrative example of a process 500 for clearing the state corresponding to an active CDN route to initiate rotation of the network load balancer sets and network addresses of the network load balancer sets in accordance with at least one embodiment. The process 500 may be performed by an address rotation system, which remove any inactive CDN routes and clear the state corresponding to an active CDN route to initiate rotation of the various sets of network load balancers. In an embodiment, the address rotation system detects 502 a triggering event that causes the address rotation system to initiate the process for rotating the various sets of network load balancers. In some instances, the triggering event may an indication, from a computing resource monitoring service, that suspicious activity has been detected within the network. For example, the computing resource monitoring service may detect unauthorized access to the origin servers or network load balancers. Alternatively, the computing resource monitoring service may determine, based on a notification from a CDN server provider, that one or more entities have attempted to access to the origin servers purporting to be a CDN server provided by the CDN server provider. In other instances, the triggering event may be the passing of a pre-determined period of time, after which the rotation of the various sets of network load balancers, as well as the DNS name of the origin servers and the IP addresses of the network load balancers, is to begin.

In response to detecting this triggering event, the address rotation system may identify 504 the active CDN route used by the CDN servers to access the origin servers via the network load balancers. For instance, the address rotation system may query a control plane of the CDN servers to identify the active CDN route. The identification of the active CDN route may result in identification of the active DNS name of the origin servers used by the CDN servers to query the DNS and of the active IP addresses corresponding to the active set of network load balancers to which the CDN servers may establish an SSL session for accessing the origin servers. For instance, the address rotation system may use network identifiers corresponding to the active IP addresses to identify the active set of network load balancers that are processing incoming requests to access the set of origin servers in the network.

In an embodiment, the address rotation system initiates 506 removal of any inactive CDN routes previously utilized by the CDN servers to access the origin servers through any of the network load balancers of the drainage sets of network load balancers. For instance, the network load balancers may include one or more drainage sets of network load balancers that may be processing any pending requests obtained prior to activation of the active set of network load balancers and of the active CDN route (e.g., active DNS name and corresponding IP addresses). If any of the one or more drainage sets of network load balancers have completed processing of its pending requests, the address rotation system may determine that the corresponding CDN route is now inactive. As a result, the address rotation system may release the inactive DNS name and corresponding IP addresses of the inactive CDN routes.

Upon initiating the removal of the inactive CDN routes, the address rotation system may clear 508 the state corresponding to the active CDN route. For instance, the address rotation system may prepare a staged set of network load balancers for rotation to an active state. Further, the address rotation system may remove, from the DNS, a DNS entry corresponding to the DNS name of the origin servers and the corresponding IP addresses of the network load balancers of the active set of network load balancers. If this process has been completed successfully, the address rotation system may initiate 510 rotation of the various sets of network load balancers of the fleet of network load balancers, as described below in connection with FIG. 6.

It should be noted that the process 500 may include additional and/or alternative operations that may be performed by the address rotation system. For instance, in addition to clearing the state corresponding to the active route the address rotation system may further determine whether drainage of the oldest drainage set of network load balancers has been completed. The oldest drainage set of network load balancers may have its state changed from "drainage" to "staged" as part of the set rotation process described above. Alternatively, a set of network load balancers having the state of "drainage" may have its state changed to another state, where that other state represents that the set of network load balancers is not in use. For instance, the oldest drainage set of network load balancers may be no longer in use as a result of having completed processing its set of pending requests. Thus, the network load balancers of the oldest drainage subset may need to have completed processing of any pending requests from the CDN servers at any point prior to being needed to assume a "staged" state. If drainage of this oldest drainage set of network load balancers has not been completed, the address rotation system may allow this oldest drainage set of network load balancers to continue drainage of the corresponding load balancers. In an embodiment, a set of network load balancers may be torn down (e.g., disconnected and/or disassembled) completely once drained. On a subsequent rotation, at the commencement of rotation, a new set of network load balancers may be spun up (e.g., powered-up, instantiated, etc.), set to "staged," and subsequently moved to "active."

Figure 6:
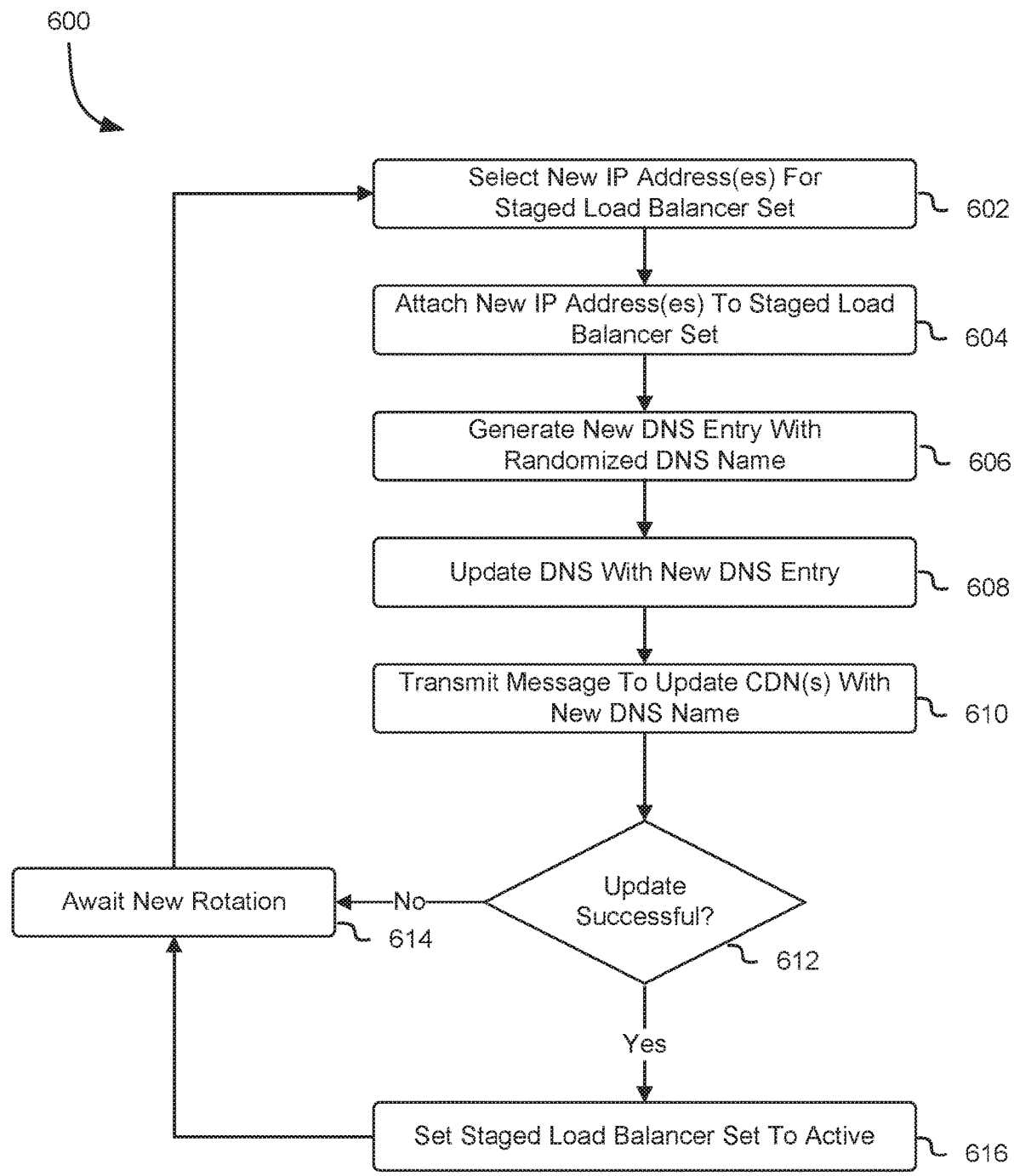
FIG. 6 shows an illustrative example of a process for attaching new IP addresses to a set of staged network load balancers and updating a Domain Name System (DNS) with a new DNS entry specifying a new DNS name for a set of origin servers and the new IP addresses in accordance with at least one embodiment.

FIG. 6 shows an illustrative example of a process 600 for attaching new IP addresses to a set of staged network load balancers and updating a Domain Name System (DNS) with a new DNS entry specifying a new DNS name for a set of origin servers and the new IP addresses in accordance with at least one embodiment. The process 600 may be performed by the aforementioned address rotation system, which may attach new IP addresses to a staged set of network load balancers that is to be set to an "active" state, as well as generate a new DNS name for the origin servers. The process 600 may be performed at the conclusion of the process 500 described above in connection with FIG. 5. In an embodiment, the address rotation system selects 602 a new set of IP addresses for the network load balancers of the staged set of network load balancers. For instance, the address rotation system may obtain, from a pool of available IP addresses, a set of IP addresses that are to be attached to the network load balancers of the staged set of network load balancers. The pool of available IP addresses may be maintained by a service provider that provides the fleet of network load balancers and the origin servers. Alternatively, the pool of available IP addresses may be associated with an account of an entity that provides the origin servers and the network load balancers through a virtual private network provisioned through a computing resource service provider.

The address rotation system may attach 604 the IP addresses obtained from the pool of available IP addresses to the staged set of network load balancers. Additionally, the address rotation system may generate 606 a new DNS entry that includes these IP addresses and a new DNS name for the origin servers. As noted above, the address rotation system may generate, as the machine name for the DNS name, a random alphanumeric string of characters. For instance, the address rotation system may maintain a common domain name and domain name extension (e.g., "example.com") for the origin servers while changing the machine name during every rotation cycle. As noted above, the length of the random alphanumeric character string may be selected such that it may be difficult for another entity, using brute force techniques, to obtain the active DNS name of the origin servers within the pre-determined period of time for rotation of the DNS name of the origin servers and IP addresses of the network load balancers.

In an embodiment, the address rotation system accesses the DNS in order to update 608 the DNS with the new DNS entry. For instance, the address rotation system may identify an existing DNS entry corresponding to the previously utilized DNS name and IP addresses and remove this entry from DNS. The address rotation system may maintain this existing DNS entry in memory in the event that a failure in the rotation of the various sets of the network load balancers or of the DNS name within the CDN servers is detected, requiring the address rotation system to revert to the previously used DNS name and IP addresses. The address rotation system may add the newly created DNS entry to DNS. Additionally, the address rotation system may transmit 610 a message to a CDN server control plane or provider to cause the CDN server control plane or provider to update the CDN servers with the new DNS name. The message may include the newly created DNS name specified in the DNS entry.

The address rotation system may query the CDN server control plane or provider to determine 612 whether the update of the CDN servers was performed successfully. If the address rotation system determines that the update was not completed successfully, the address rotation system may await 614 a new rotation cycle. This may include performing the operations of the process 500 described in connection with FIG. 5 and, subsequently, selecting 602 new IP addresses for the staged set of network load balancers. However, if the address rotation system determines that the CDN servers were updated successfully by the CDN server control plane or provider, the address rotation system may set 616 the state of the staged set of network load balancers to "active." Further, as part of the rotation of the various sets, the address rotation system may transition the previously active set of network load balancers to a "drainage" state, whereby these network load balancers may continue to process any pending requests to access the origin servers from CDN servers that utilized the now inactive DNS name and corresponding IP addresses. The address rotation system may also set the state of the oldest drainage set of network load balancers to a "staged" state. Thus, if another rotation cycle is performed this set of network load balancers now set to a "staged" state may be assigned a new set of IP addresses in anticipation of this set becoming the next active set of network load balancers for processing incoming requests from the CDN servers.

It should be noted that the process 600 may include additional and/or alternative operations that may be performed by the address rotation system. For instance, if the address rotation system determines that the update was not completed successfully, the address rotation system may determine whether to retry transmitting 610 the message to update the CDN server control plane or provider to cause the CDN server control plane or provider to update the CDN servers with the new DNS name. For instance, the address rotation system may determine how much time remains before the next rotation cycle for the network load balancer sets and for the DNS name and IP addresses to be attached to the staged load balancer set. If the remaining time before the next rotation cycle is greater than a threshold amount of time, the address rotation system may retry transmitting the message to update the CDN server control plane or provider. Alternatively, the address rotation system may determine whether a threshold number of attempts have been made to successfully update the CDN server control plane or provider. If the threshold number of attempts have not been made, the address rotation system may retry transmitting the message to update the CDN server control plane or provider. Otherwise, the address rotation system may await the next rotation cycle.

Figure 7:
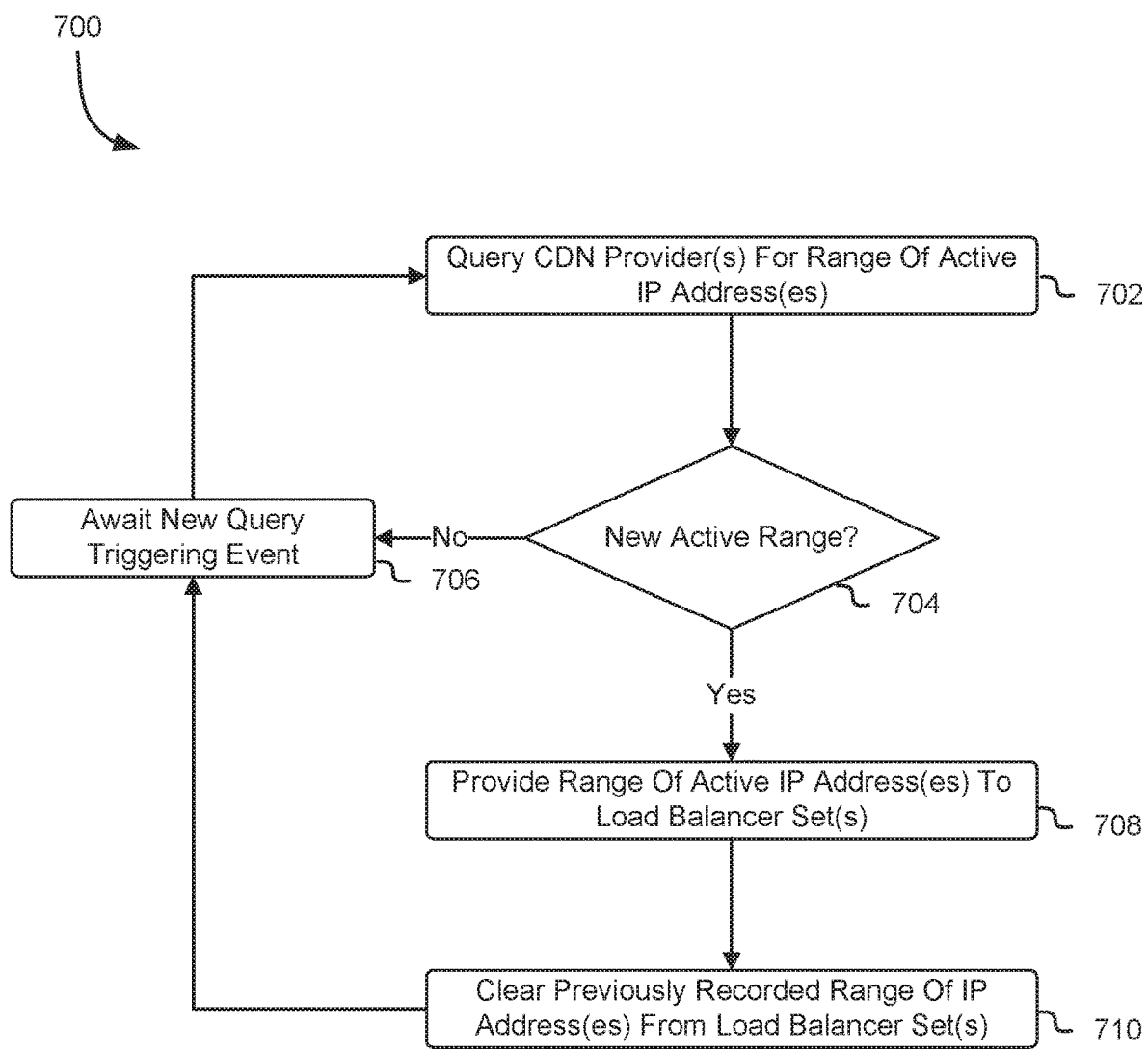
FIG. 7 shows an illustrative example of a process for identifying a range of active IP addresses for a set of CDN servers and providing this range to the network load balancer sets in accordance with at least one embodiment.

FIG. 7 shows an illustrative example of a process 700 for identifying a range of active IP addresses for a set of CDN servers and providing this range to the network load balancer sets in accordance with at least one embodiment. The process 700 may be performed by the address rotation system and/or by the active set of network load balancers. In an embodiment, the address rotation system and/or the active set of network load balancers queries 702 the control plane or provider of the CDN servers to identify a range of active IP addresses of the CDN servers. This range of active IP addresses may be used by the active set of network load balancers to ensure that requests to access the origin servers originate from CDN servers provided by the CDN server provider or are otherwise associated with the CDN server control plane. In response to the query, the address rotation system and/or the active set of network load balancers may obtain, from the control plane or CDN server provider, the range of active IP addresses from which IP addresses are assigned to the CDN servers. As noted above, the control plane or CDN server provider may also rotate the active IP addresses of the CDN servers periodically or in response to a triggering event.

In response to obtaining the range of active IP addresses from the control plane or CDN server provider, the address rotation system and/or active set of network load balancers may determine 704 whether this is a new range of active IP addresses. For instance, the address rotation system and/or the active set of network load balancers may compare the obtained range of active IP addresses to a previously obtained range of active IP addresses used by the active set of network load balancers to evaluate the CDN servers. If the obtained range of active IP addresses is not new, the address rotation system and/or the active set of network load balancers may await 706 a new query triggering event to query 702 the CDN server provider or control plane for a current range of active IP addresses for the CDN servers.

If the range of active IP addresses provided by the control plane or the CDN server provider is new, the address rotation system may provide 708 this range to the various sets of network load balancers. Alternatively, if it is the active set of network load balancers that performs the process 700, the active set of network load balancers may distribute this range to the other network load balancers of the other sets. The address rotation system and/or the active set of network load balancers may also clear 710 any previously recorded ranges of IP addresses from the various sets of network load balancers. Thus, the various sets of network load balancers may utilize the range of active IP addresses to vet the CDN servers attempting to access the origin servers.

It should be noted that the process 700 may include additional and/or alternative operations that may be performed by the address rotation system. For instance, rather than clearing the previously recorded range of IP addresses from the network load balancer sets, the address rotation system may evaluate the newly obtained active range of IP addresses and compare this to the previously recorded range of IP addresses to identify any differences. If there are any differences, the address rotation system may provide these differences to the network load balancer sets, which may implement these differences without need to clear the previously recorded range of IP addresses. In an embodiment, rather than querying the CDN providers for the range of active IP addresses for the CDN servers, the address rotation system obtains the range of active IP addresses from the control plane or provider of the CDN servers at any time. For instance, the control plane or provider of the CDN servers may provide the range of active IP addresses upon implementation of a new CDN server, upon termination of an existing CDN server, or any other event that may cause a change to the range of active IP addresses. Thus, the address rotation system, in some instances, need not query the CDN control plane or provider to obtain the range of active IP addresses.

Figure 8:
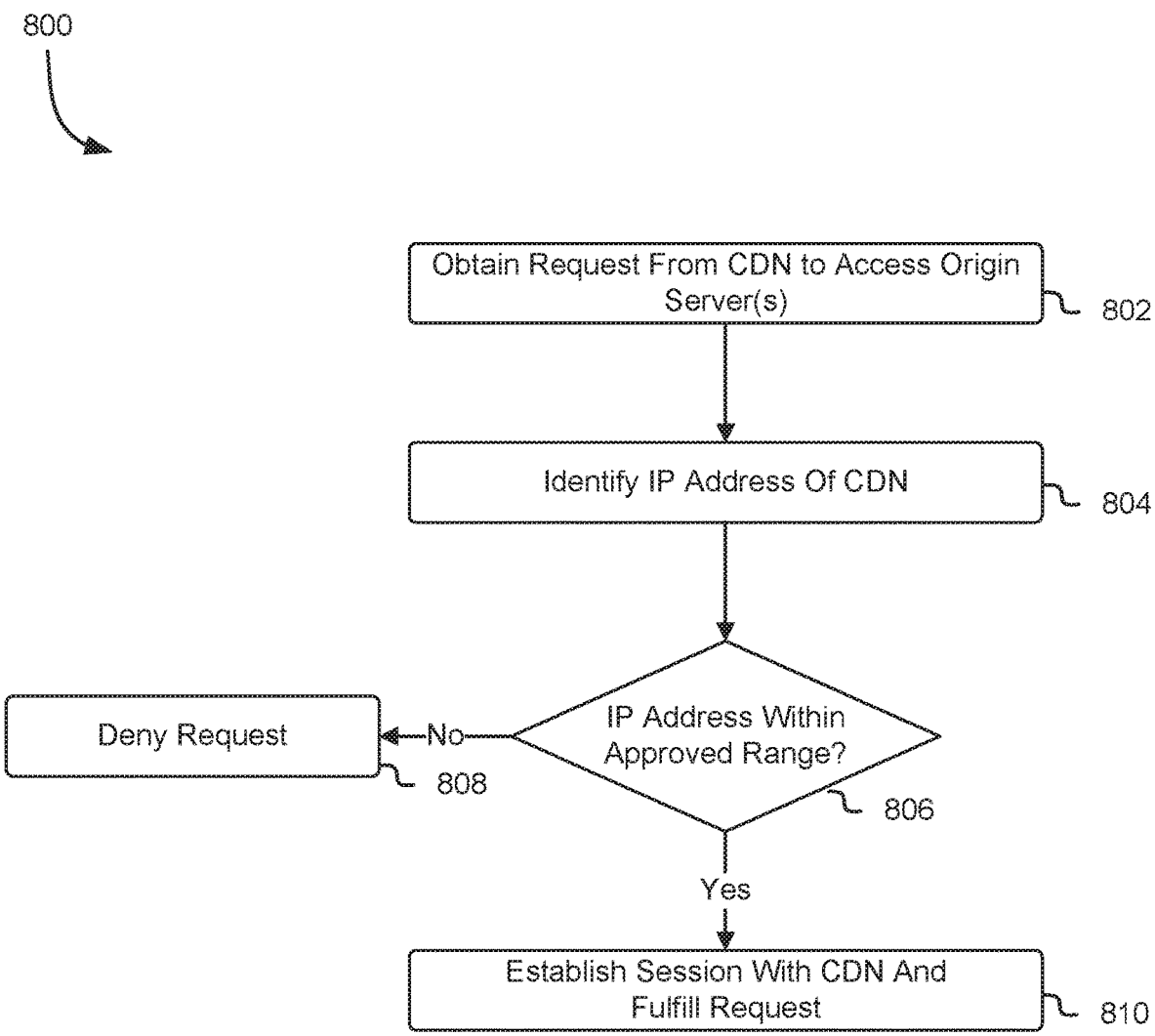
FIG. 8 shows an illustrative example of a process for establishing an SSL session with a CDN server to allow the CDN server to access an origin server in accordance with at least one embodiment.

FIG. 8 shows an illustrative example of a process 800 for establishing an SSL session with a CDN server to allow the CDN server to access an origin server in accordance with at least one embodiment. The process 800 may be performed by a network load balancer of an active set of network load balancers that enable access to origin servers within a network. In an embodiment, a network load balancer of the active set of network load balancers obtains 802 a request from a CDN server or other entity to access an origin server. The request may specify information about the CDN server or other entity, such as the IP address of the CDN server or other entity. From this information, the network load balancer may identify 804 the IP address of the CDN server or other entity. Further, the network load balancer may determine 806 whether the IP address of the CDN server or other entity is within the range of active IP addresses provided by the CDN server control plane or provider, as described above in connection with the process 700 and illustrated in FIG. 7.

If the IP address of the CDN server or other entity that submitted the request to access an origin server is not within the range of active IP addresses provided by the CDN server control plane or provider, the network load balancer may deny 808 the request. In some embodiments, the network load balancer transmits a notification to the address rotation system and/or to the CDN server provider to indicate that the network load balancer has obtained a request from a server or other entity purporting to be a CDN server provided by the CDN server provider. This may cause the address rotation system and the CDN server provider to perform one or more remedial actions. For instance, in response to this notification, the address rotation system may initiate another rotation cycle to change the DNS name of the origin servers and the IP addresses of the network load balancers.

However, if the IP address of the CDN server or other entity is within the range of active IP addresses provided by the CDN server control plane or provider, the network load balancer may establish 810 a secure communications session with the CDN server and fulfill the request. For instance, the network load balancer may transmit, to the CDN server or other entity, a digital certificate that includes a public cryptographic key of a cryptographic key pair to initiate an SSL handshake for establishing a secure communications session between the CDN server and the network load balancer. The digital certificate may specify the DNS name of the origin servers, using a wildcard character in place of the randomized alphanumeric character string previously provided by the address rotation system to the CDN servers. For instance, the digital certificate may identify the DNS name as "*.example.com" in place of the complete machine name generated by the address rotation system. The CDN server or other entity may use this digital certificate to authenticate the network load balancer and to obtain the cryptographic key for encrypting communications to the network load balancer and to decrypt communications from the network load balancer.

Figure 9:
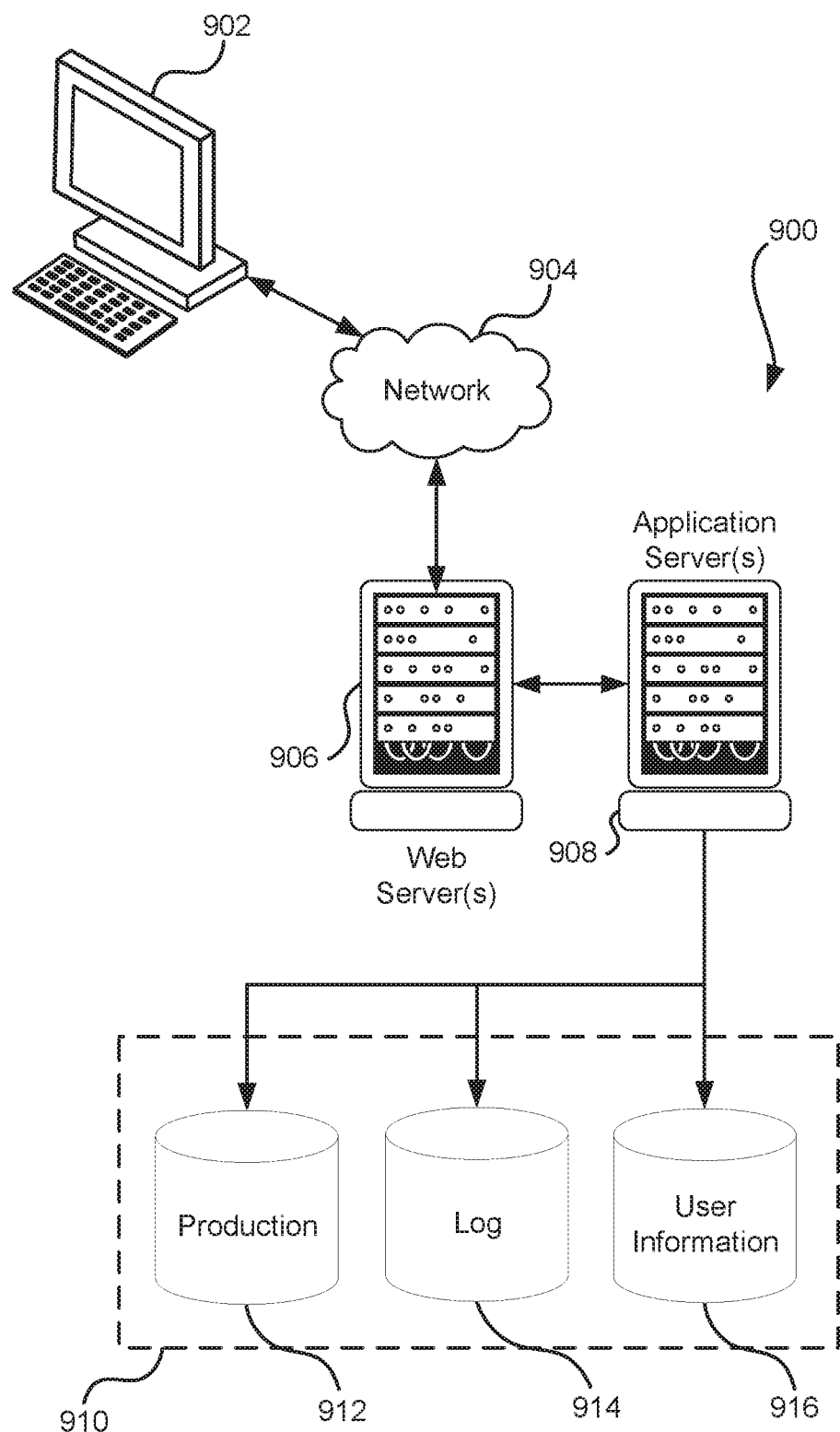
FIG. 9 shows an illustrative example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining a range of active Internet Protocol (IP) addresses of a set of Content Delivery Network (CDN) servers, the set of CDN servers including at least a first CDN server;
   providing the range of active IP addresses to a first network load balancer and a second network load balancer to cause the first and second network load balancers to evaluate an IP address of the first CDN server to determine whether the IP address is within the range of active IP addresses;
   identifying, in response to a triggering event, a networking route utilized by the first CDN server to access an origin server through the first network load balancer;
   determining, based on the networking route, a Domain Name System (DNS) name of the origin server and a set of IP addresses of the first network load balancer;
   attaching a new set of IP addresses to a second network load balancer;
   generating a new DNS name of the origin server;
   updating a DNS to incorporate an entry comprising the new DNS name and the new set of IP addresses;
   providing the new DNS name to the CDN server; and
   updating the first and second network load balancers such that:
      the first network load balancer processes a set of requests; and
      the second network load balancer processes new requests from the first CDN server to access the origin server.

2. The computer-implemented method of claim 1, wherein the triggering event is a determination that a period of time has elapsed since a previous update to the first and second network load balancers.

3. The computer-implemented method of claim 1, wherein generating the new DNS name of the origin server comprises selecting a randomized alphanumeric character string as a machine name of the origin server.

4. A system, comprising at least one computing device that implements one or more services, wherein the one or more services:
   obtain a range of active network addresses of a second server;
   provide the range of active network addresses of the second server to a first server to cause the first server to use the range of active network addresses to identify network traffic of the second server;
   detect a trigger to rotate location information of the first server that provides content to be served by the second server, the first server having an assigned first name that resolves to a first network address in a name service; and
   in response to the trigger:
      assign a second network address to the first server;
      update the name service to resolve a second name to the second network address; and
      update the second server with the second name.

5. The system of claim 4, wherein assigning the second network address to the first server comprises attaching the second network address to a network load balancer that processes requests from the second server to obtain the content from the first server.

6. The system of claim 4, wherein the one or more services further generate a randomized string of characters to serve as a machine name of the second name.

7. The system of claim 4, wherein the trigger is an indication of suspicious activity by an unauthorized entity to access the first server.

8. The system of claim 4, wherein the one or more services further:
   identify, in response to the trigger, a networking route utilized by the second server to access the first server; and
   evaluate the networking route to obtain the assigned first name and the first network address.

9. The system of claim 4, wherein the one or more services further:
   obtain, from a pool of available network addresses, the second network address, the second network address being different from the first network address; and
   release the first network address into the pool of available network addresses to disassociate the first network address from the first server.

10. The system of claim 4, wherein updating the name service to resolve the second name to the second network address comprises:
    generating a first entry in the name service corresponding to the second name and the second network address;
    identifying a second entry in the name service corresponding to the assigned first name and the first network address; and
    removing the second entry from the name service.

11. A non-transitory computer-readable storage medium storing thereon executable instructions that, as a result of being executed by one or more processors of a computer system, cause the computer system to at least:
    query a second server to obtain a range of active network addresses utilized by the second server;
    provide the range of active network addresses to a first server to cause the first server to use the range of active network addresses to determine whether a request to obtain content originated from the second server;
    detect a trigger to rotate location information of the first server that provides the content to be served by the second server, the first server having an assigned first name that resolves to a first network address in a name service; and in response to the trigger:
- update the name service to resolve a second name to a second network address by which the first server can be communicated with; and
- update the second server to use the second name to obtain the content.

12. The non-transitory computer-readable storage medium of claim 11, wherein the executable instructions further cause the computer system to:
- identify a networking route utilized by the second server to access the first server; and
- determine, based on the networking route, the assigned first name and the first network address.

13. The non-transitory computer-readable storage medium of claim 11, wherein the trigger is an indication that a period of time has elapsed since implementation of the assigned first name and of the first network address.

14. The non-transitory computer-readable storage medium of claim 11, wherein the executable instructions further cause the computer system to assign the second network address to a network load balancer through which requests are provided to the first server.

15. The non-transitory computer-readable storage medium of claim 11, wherein the executable instructions that cause the computer system to update the name service to resolve the second name to the second network address further cause the computer system to:
- generate, in the name service, a first entry corresponding to the second name and to the second network address;
- identify, from the name service, a second entry corresponding to the assigned first name and the first network address; and
- delete the second entry.

16. The non-transitory computer-readable storage medium of claim 11, wherein the executable instructions that cause the computer system to update the name service to resolve the second name to the second network address further cause the computer system to:
- release the first network address into a pool of available network addresses;
- generate, using a randomized string of alphanumeric characters, a machine name of the first server;
- use the machine name to generate the second name; and
- obtain, from the pool of available network addresses, the second network address.

17. The non-transitory computer-readable storage medium of claim 11, wherein the executable instructions further cause the computer system to:
- query the second server to determine whether the second server is successfully updated to use the second network address; and
- in response to an indication from the second server that the second server is successfully updated, update a state of a network load balancer through which requests are provided to the first server to cause the network load balancer to process the requests.

* * * * *